United States Patent
Majidi et al.

(10) Patent No.: US 9,228,822 B2
(45) Date of Patent: Jan. 5, 2016

(54) NON-DIFFERENTIAL ELASTOMER CURVATURE SENSOR

(75) Inventors: Carmel Majidi, Pittsburgh, PA (US); Rebecca K. Kramer, Cambridge, MA (US); Robert J. Wood, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 287 days.

(21) Appl. No.: 13/981,101

(22) PCT Filed: Jan. 24, 2012

(86) PCT No.: PCT/US2012/022338
§ 371 (c)(1),
(2), (4) Date: Aug. 14, 2013

(87) PCT Pub. No.: WO2012/103073
PCT Pub. Date: Aug. 2, 2012

(65) Prior Publication Data
US 2013/0312541 A1    Nov. 28, 2013

Related U.S. Application Data

(60) Provisional application No. 61/435,377, filed on Jan. 24, 2011.

(51) Int. Cl.
*G01B 7/16*    (2006.01)
*G01B 7/28*    (2006.01)

(52) U.S. Cl.
CPC .. *G01B 7/18* (2013.01); *G01B 7/28* (2013.01); *G01B 7/281* (2013.01)

(58) Field of Classification Search
CPC ........ G01B 5/213; G01B 7/293; G01B 7/282; G01B 7/28; G01D 5/2291; G01D 5/20; G01D 5/22; G01D 5/12
USPC .................................... 33/534, 542, 561, 700
See application file for complete search history.

(56) References Cited

U.S. PATENT DOCUMENTS

| 3,304,528 A | 2/1967 | Trastrelli et al. |
| 3,789,511 A * | 2/1974 | Groom et al. ................. 33/312 |

(Continued)

FOREIGN PATENT DOCUMENTS

| JP | 06-258076 | 9/1994 |
| JP | 2006-318175 | 11/2006 |

(Continued)

OTHER PUBLICATIONS

Alirezaei et al., Proc. IEEE-RAS Int. Conf. on Humanoid Robots (ICR '07), Pittsburg, PA, Nov. 2007, pp. 167-173 (2007). "A highly stretchable tactile distribution sensor for smooth surfaced humanoids."

(Continued)

*Primary Examiner* — Yaritza Guadalupe-McCall
(74) *Attorney, Agent, or Firm* — Nixon Peabody LLP; David S. Resnick; David F. Crosby

(57) ABSTRACT

A hyperelastic, soft microfluidic film measures bending curvature using a novel non-differential mechanism. Disclosed embodiments of the elastomer-based solution allows for curvature sensing directly on a bending plane and thus eliminates limitations imposed by strain gauge factor (GF) and sensor thickness (Z). Due to soft lithography microfabrication and design methods the disclosed curvature sensors are elastically soft (modulus 0.1-1 MPa) and stretchable (100-1000% strain). In contrast to existing curvature sensors that measure differential strain, embodiments of the present invention measures curvature directly and allows for arbitrary gauge factor and film thickness. Moreover, the sensor is composed entirely of soft elastomer (PDMS or Ecoflex®) and conductive liquid (eutectic gallium indium, (eGaIn)) and thus remains functional even when stretched to several times its natural length. Electrical resistance in the embedded eGaIn microchannel is measured as a function of bending curvature for a variety of sensor designs.

14 Claims, 7 Drawing Sheets

(56) References Cited

U.S. PATENT DOCUMENTS

| | | | |
|---|---|---|---|
| 4,014,217 A | | 3/1977 | Lagasse et al. |
| 4,492,949 A | | 1/1985 | Peterson et al. |
| 4,547,668 A | | 10/1985 | Tsikos |
| 4,570,354 A | | 2/1986 | Hindes |
| 4,588,348 A | | 5/1986 | Beni et al. |
| 4,668,861 A | | 5/1987 | White et al. |
| 5,313,840 A | | 5/1994 | Chen et al. |
| 5,333,217 A | * | 7/1994 | Kossat .......................... 385/32 |
| 5,341,687 A | | 8/1994 | Stan |
| 5,442,729 A | | 8/1995 | Kramer et al. |
| 5,553,500 A | | 9/1996 | Grahn et al. |
| 5,610,528 A | | 3/1997 | Neely et al. |
| 5,672,979 A | | 9/1997 | Christopher |
| 5,828,798 A | * | 10/1998 | Hopenfeld ...................... 385/12 |
| 5,917,165 A | | 6/1999 | Platt et al. |
| 5,959,863 A | | 9/1999 | Hoyt et al. |
| 6,414,674 B1 | | 7/2002 | Kamper et al. |
| 6,915,701 B1 | | 7/2005 | Tarler |
| 6,951,143 B1 | | 10/2005 | Adderton et al. |
| 7,295,724 B2 | | 11/2007 | Wang et al. |
| 7,500,399 B2 | | 3/2009 | Cheng et al. |
| 7,658,119 B2 | | 2/2010 | Loeb et al. |
| 7,815,998 B2 | | 10/2010 | Simpson et al. |
| 7,854,173 B2 | | 12/2010 | Cheng et al. |
| 8,033,189 B2 | | 10/2011 | Hayakawa et al. |
| 8,316,719 B2 | | 11/2012 | Majidi et al. |
| 2005/0076715 A1 | | 4/2005 | Kuklis et al. |
| 2005/0160827 A1 | | 7/2005 | Zbedblick et al. |
| 2008/0087069 A1 | | 4/2008 | Renken et al. |
| 2008/0087105 A1 | | 4/2008 | Renken et al. |
| 2008/0108122 A1 | | 5/2008 | Paul et al. |
| 2010/0132476 A1 | | 6/2010 | Cheng et al. |
| 2011/0132871 A1 | | 6/2011 | White et al. |
| 2011/0193363 A1 | | 8/2011 | Nishiwaki |
| 2013/0312541 A1 | * | 11/2013 | Majidi et al. ............. 73/862.454 |

FOREIGN PATENT DOCUMENTS

| | | |
|---|---|---|
| WO | 01/88935 | 11/2001 |
| WO | 2007/089158 | 8/2007 |
| WO | 2012/050938 | 4/2012 |
| WO | 2013/044226 | 3/2013 |

OTHER PUBLICATIONS

Cheng et al., Sensors and Actuators A, 166:226-233 (2011). "The development of a highly twistable tactile sensing array with stretchable helical electrodes."

Chigusa et al., Second Joint EuroHaptics Conference and Symposium on Haptic Interfaces for Virtual Environment and Teleoperator Systems (WHC'07). "Large Area Sensor Skin based on Two-Dimensional Signal Transmission Technology."

Cotton et al., IEEE Sensors Journal, 9(12):2008-2009 (2009). "A Multifunctional Capacitive Sensor for Stretchable Electronic Skins."

Dickey et al., Adv. Funct. Mater., 18:1097-1104 (2008). "Eutectic Gallium—Indium (EGaln): A Liquid Metal Alloy for the Formation of Stable Structures in Microchannels at Room Termperature."

Duffy et al., Anal. Chem., 70:4974-4984 (1998). "Rapid Prototyping of Microfluidic Systems in Poly (dimethylsiloxane)."

Herr et al., Key Note Address, Smart Structures and Materials 2004: Electroactive Polymer Actuators and Devices, edited by Yoseph Bar-Cohen, Proceedings of SPIE vol. 5385 (SPIE, Bellingham, WA, 2004). "New Horizons for orthotic and prosthetic technology: artificial muscle for ambulation."

Hoshi et al., Proceedings of the 2006 IEEE International Conference on Robotics and Automation, Orlando Florida, May 2006. "Robot Skin Based on Touch-Area-Sensitive Tactile Element."

Hyun-Joong et al., ECE Faculty Publications, Paper 49 (2008). "A multiaxial stretchable interconnect using liquid-alloy-filled elastomeric microchannels."

Khang et al., Science, 311(5758):208-212 (2006). "A Stretchable Form of Single-Crystal Silicon for High-Performance Electronics on Rubber Substrates."

Kim et al., Microelectronic Engineering, 84:1532-1535 (2007). "Fabrication of microchannel containing nanopillar arrays using micromachined AAO (anodic aluminum oxide) mold."

Kim et al., Science, 320:507-511 (2008). "Stretchable and Foldable Silicon Integrated Circuits."

Kim et al., Applied Physics Letters, 92:011904 (2008). "A multiaxial stretchable interconnect using liquid-alloy-filled elastomeric microchannels."

Kirchner et al., Sensors and Actuators A, 48:96-104 (2008). "Capacitive sensor for object ranging and material type identification."

Kramer et al., 2011 IEEE International Conference on Robotics and Automation, Shanghai International Conference Center, May 9-32, 2011. "Wearable tactile keypad with stretchable artificial skin."

Lacasse et al., 2010 IEEE International Conference on Robotics and Automation, Anchorage Convention District, May 3-8, 2010, Anchorage, Alaska, U.S.A. "Characterization of the Electrical Resistance of Carbon-Black-Filled Silicone: Application to a Flexible and Stretchable Robot Skin."

Lorussi et al., IEEE Transactions on Information Technology in Biomedicine, 9(3), Sep. 2005. "Strain Sensing Fabric for Hand Posture and Gesture Monitoring."

Marculescu et al., Proceedings of the IEEE, 2018 (2003). "Electronic Textiles: A Platform for Pervasive Computing."

Menon et al., 2005 Maskless lithography Mater. Today, 8:26-33.

Noda et al., 2010 IEEE International Conference on Robotics and Automation, Anchorage Convention District, May 3-8, 2010, Anchorage, Alaska, U.S.A. "Stretchable liquid tactile sensor for robot-joints."

Okamura et al., The International Journal of Robotics, 20:925-938 (2001). "Feature Detection for Haptic Exploration with Robotic Fingers."

Park et al., IEEE Transactions on Robotics, 25(6):1319-1331 (2009). "Exoskeletal Force-Sensing End-Effectors With Embedded Optical Fiber-Bragg-Grating Sensors."

Park et al., J. Micromech. Microeng., 20:125029 (2010). "Hyperelastic pressure sensing with a liquid-embedded elastomer."

Park et al., 2011 IEEE/RSJ International Conference on Intelligent Robots and Systems, Sep. 25-30, 2011, San Francisco, CA, U.S.A. "Bio-inspired Active Soft Orthotic Device for Ankle Foot Pathologies."

Pique et al., J. Mater. Res., 15(9):1872-1875 (2000). "Direct writing of electronic and sensor materials using a laser transfer technique."

Puangmali et al., IEEE Sensors Journal, 8(4):371-381 (2008). "State-of-the-Art in Force and Tactile Sensing for Minimally Invasive Surgery."

Quake et al., Science, 290(5496):1536-1540 (2000). "From Micro- to Nanofabrication with Soft Materials."

Rogers et al., PNAS, 106(27):10875-10876 (2009). "A curvy, stretchy future for electronics."

So et al., Adv. Funct. Mater., 19:3632-3637 (2009). "Reversibly Deformable and Mechanically Tunable Fluidic Antennas."

Stirling et al., Journal of Materials Engineering and Performance, 20(4-5):658-662 (2011). "Applicability of Shape Memory Alloy Wire for an Active, Soft Orthotic."

Tajima et al., Advanced Robotics, 16(4):381-397 (2002). "Development of soft and distributed tactile sensors and the application to a humanoid robot."

Takei et al., Nature Materials, 9:821-826 (2010). "Nanowire active-matrix circuitry for low-voltage macroscale artificial skin."

Tseng et al., Journal of Micromechanics and Microengineering, 19:085002 (2009). "A slow-adapting microfluidic-based tactile sensor."

Ulmen et al., 2010 IEEE International Conference on Robotics and Automation, Anchorage Convention District, May 3-8, 2010, Anchorage, Alaska, USA. "A Robust, Low-Cost and Low-Noise Artificial Skin for Human-Friendly Robots."

Unger et al., Science, 288(5463):113-116 (2000). "Monolithic Microfabricated Valves and Pumps by Multilayer Soft Lithography."

Ventrelli et al., Proc. IEEE Int. Conf. Rob. Biomimetics, Guilin, China, Dec. 2009, pp. 123-128. "Development of a stretchable skin-like tactile sensor based on polymeric composites."

Vogt et al., IEEE 2012, "Multi-axis force sensing in a soft artificial skin."

(56) References Cited

OTHER PUBLICATIONS

Wettels et al., Advanced Robotics, 22:829-849 (2008). "Biomimetic Tactile Sensor Array."

Whitney, Proceedings of Phys. Soc., Mar. 26, 1949, pp. 5-6. "The measurement of changes in human limb-volume by means of a mercury-in-rubber strain gauge."

Xia et al., Annu. Rev. Mater. Sci., 28:153-184 (1998). "Soft Lithography."

Yamada et al., Proceedings of the 2001 IEEE/RSJ, International Conference on Intelligent Robots and Systems, Maui, Hawaii, U.S.A., Oct. 29-Nov. 3, 2001. "Artificial Finger Skin having Ridges and Distributed Tactile Sensors used for Grasp Force Control."

Yoshikai et al., 9th IEEE-RAS International Conference on Humanoid Robots, Dec. 7-10, 2009 Paris France. "Development of Soft Stretchable Knit Sensor for Humanoids' Whole-body Tactile Sensibility."

* cited by examiner

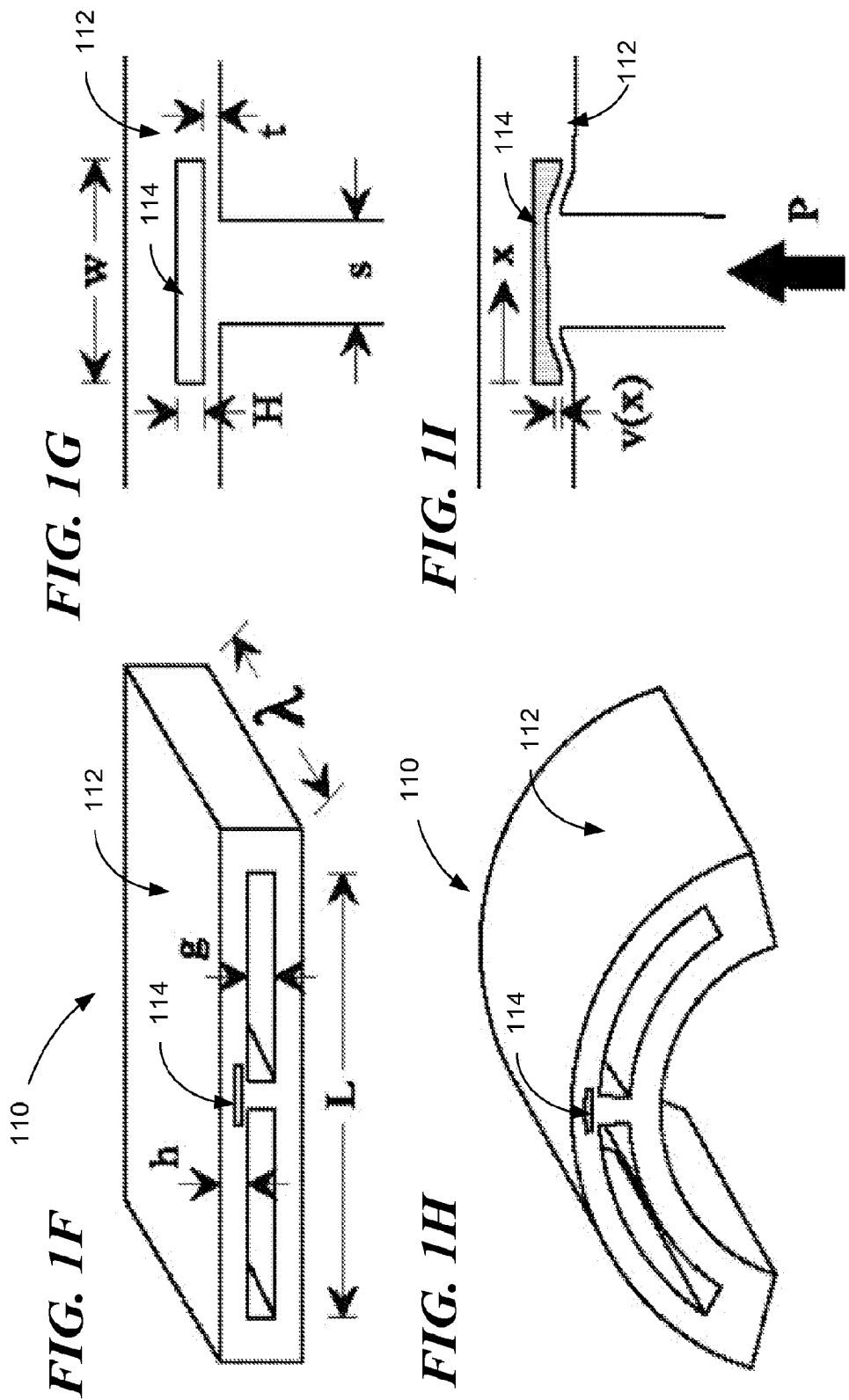

NON-DIFFERENTIAL ELASTOMER CURVATURE SENSOR

CROSS REFERENCE TO RELATED APPLICATIONS

This application is a 35 U.S.C. §371 National Phase Entry Application of International Application No. PCT/US2012/022338 filed Jan. 24, 2012, which designates the U.S., and which claims benefit under 35 U.S.C. §119(e) of U.S. Provisional Patent Application No. 61/435,377, filed Jan. 24, 2011, the entire contents of which are incorporated herein by reference.

GOVERNMENT SUPPORT

This invention was made with government support under grant DMR-0820484 (CM) awarded by the National Science Foundation. The government has certain rights in the invention.

TECHNICAL FIELD

The invention relates generally to a sensing device and method for measuring bending curvature. More particularly, the invention relates to a device and a method for measuring curvature via a deformable conductive micro-structure embedded within a prescribed material substrate.

BACKGROUND

Whitney first proposed embedding an elastomer with a conductive liquid for strain sensing. See, Whitney, R. J. "The measurement of changes in human limb-volume by means of a mercury-in-rubber strain gauge," *Proceedings of the Physiological Society* 109 5P-6P (1949). Whitney filled a rubber tube with mercury to measure the change in circumferential girth of a human limb. Sixteen years later, Rastrelli, Anderson, and Michie filed a patent application, that issued as U.S. Pat. No. 3,304,528, for a more general design for an elastomeric strain gauge that included a broad range of materials. In 2007, Cheng, Chao, and Cheung filed a patent application, that issued as U.S. Pat. No. 7,500,399, for a strain gauge containing doped polymeric fluid. A recent embodiment of the "Whitney" strain gauge is polydimethylsiloxane (PDMS) rubber embedded with a microchannel of eutectic, gallium indium (eGaIn) conductive liquid. See, Dickey, M. D., Chiechi, R. C., Larsen, R. J., Weiss, E. A., Weitz, D. A., and Whitesides, G. M. "Eutectic Gallium-Indium (EGaIn): A Liquid Metal Alloy for the Formation of Stable Structures in Microchannels at Room Temperature," *Advanced Functional Materials* 2008 1097-1104. See, also, Kim, H. J., Son, C., and Ziaie, B. "A multiaxial stretchable interconnect using liquid alloy-filled elastomeric microchannels," *Applied Physics Letters* 92 011904 (2008).

These strain gauges, however, can only sense extensional stretch, not transverse pressure or bending curvature. Additionally, existing pressure sensors and touch screens are composed of stiff, inorganic materials and polymers that limit flexibility and/or stretch, thus preventing biomechanical compatibility.

Emerging technologies, for example wearable computing, flexible tactile displays, and soft orthotics, can depend on stretchable sensors that register the location and intensity of pressure over a broad area. These "second skin" sensors are ideally conceived to maintain functionality even when stretched to several times their natural length. Additionally, they should also be soft enough to prevent significant interference with mechanics of human motion. Lastly, the sensors should be elastic and function repeatedly without hysteresis or permanent deformation.

Elastomer-based sensors, microelectronics, and artificial skin represent the next stage in a technological progression from rigid microelectronics to MEMS to soft microfluidics. While some emerging technologies have developed limited capabilities, many existing thin-film solutions are flexible but not stretchable. In addition, the next generation of sensor and circuits should preferably be able to conform to dramatic but reversible changes in shape and rigidity without interfering with the natural mechanics of a host.

SUMMARY

It is, therefore, an object of the present invention to overcome the deficiencies of the prior art to include a curvature sensor and method for measuring curvature using a sensing device having a deformable conductive micro-structure embedded within a predefined material substrate including, for example, an elastomeric sheet, and one or more microchannels embedded in the elastomeric sheet.

BRIEF DESCRIPTION OF THE DRAWINGS

FIG. 1(*b*) illustrates a 6 mm thick PDMS sensor according to an exemplary disclosed embodiment.

FIG. 1(*c*) illustrates an Ecoflex® according to an exemplary disclosed embodiment.

FIG. 1(*d*) illustrates a perspective view of a PDMS sensor according to an exemplary disclosed embodiment.

FIG. 1(*e*) illustrates an end view of a PDMS sensor according to an exemplary disclosed embodiment.

FIGS. 1(*f*)-(*g*) illustrate a curvature sensor composed of two thin films with thickness h, length L, and width λ that are separated by a gap g and bonded along their two ends as well as along their midline by a strut of width s according to an exemplary disclosed embodiment.

FIG. 1(*h*) illustrates the curvature sensor of FIG. 1(*f*) in a bended position according to an exemplary disclosed embodiment.

FIG. 1(*i*) shows a compressive force P induced by bending the curvature sensor of FIG. 1(*f*) thereby causing the embedded channel to collapse according to an exemplary disclosed embodiment.

FIG. 2(*b*) illustrates a graphical change in electrical resistance ΔR as a function of pure bending curvature for an Ecoflex® sensor according to an exemplary disclosed embodiment.

FIG. 2(*c*) illustrates a graphical change in electrical resistance ΔR as a function of pure bending curvature for a 1.3 mm thick PDMS sensor according to an exemplary disclosed embodiment.

DETAILED DESCRIPTION OF EMBODIMENTS

Figure 1B:
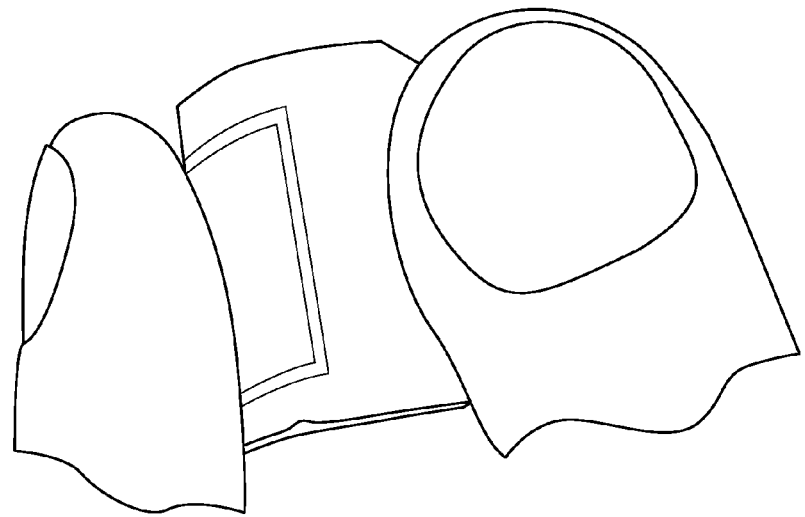
FIG. 1(*a*) illustrates a 1.3 mm thick PDMS sensor according to an exemplary disclosed embodiment.
Figure 1A:
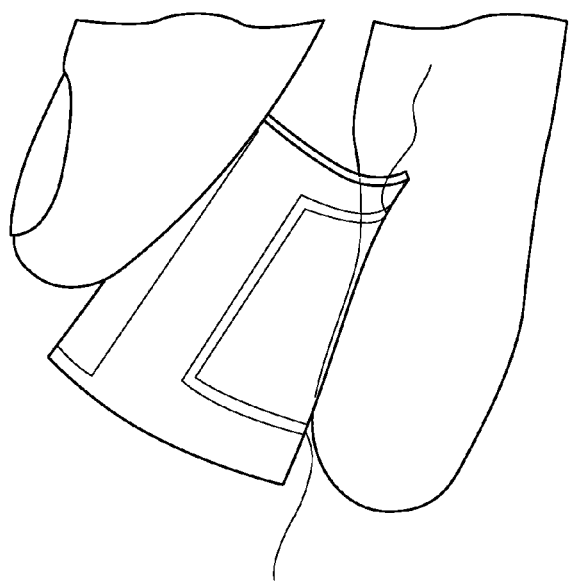
Figure 1C:
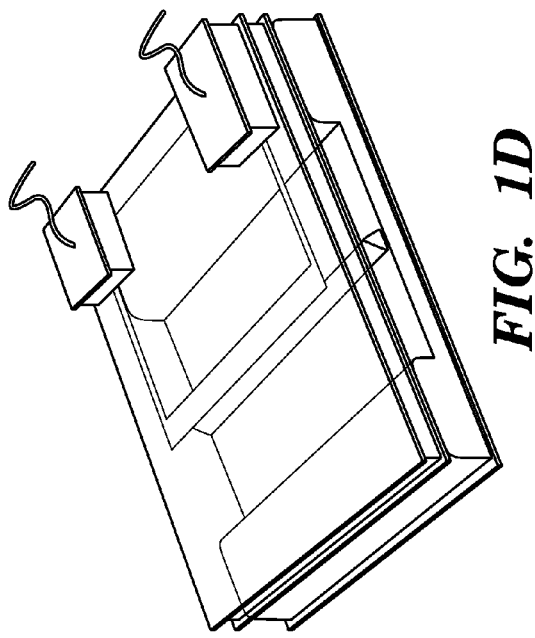
Figure 1D:
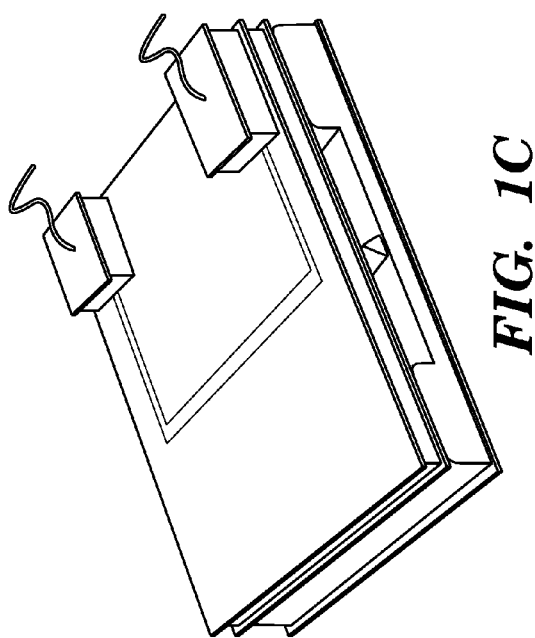
Figure 1E:
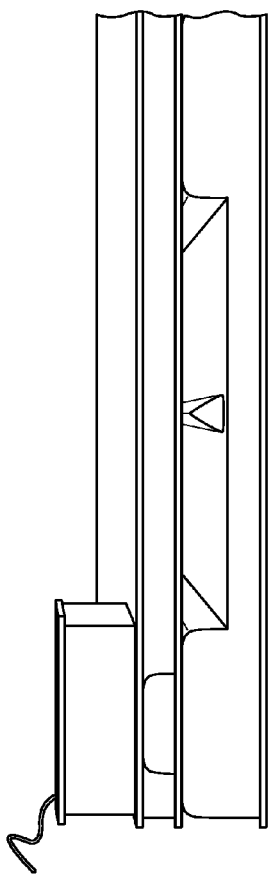

Disclosed embodiments can include an elastomeric sheet embedded with a grid of conductive liquid channels configured to register the location and intensity of localized curvature. Embodiments can be useful for applications including stretchable curvative sensing for wearable computing and large-range curvature and motion sensing for soft orthotics. The geometry and spacing of conductive channels as well as the mechanical properties and thickness of the elastomeric matrix of embodiments can be configured according to desired sensor selectivity, range, and resolution.

In contrast to existing thin-film solutions that are flexible but not stretchable, disclosed embodiments including next generation of sensors and circuits are able to conform to dramatic but reversible changes in shape and rigidity without interfering with the natural mechanics of the host. To satisfy the aforementioned requirement, one disclosed solution provides pre-buckled circuit elements and wiring into wavy patterns that unfold as the supporting elastic substrate is being stretched. This requirement can provide approximately 50-100% strains in typical applications; this versatile approach allows stretchable functionality with a broad range of thin-film metals, semiconductors, and polymers. For hyperelastic strains of 100-1000%, electronic functionality can be achieved by embedding thin elastomer film with microchannels of conductive liquid. This latter approach builds on the soft lithography techniques developed for elastomer-based microfluidics and has been utilized for strain sensing, pressure sensing, and a mechanically tunable antenna.

Other disclosed embodiments of the present invention extend the principle of liquid embedded elastomers to introduce a stretchable thin-film curvature sensor as illustrated, for example, in FIGS. 1(*a*)-(*e*). Turning to FIG. 1(*f*), a sensor 10 can be composed of two coplanar elastic films that are connected along their edges and at their center by a strut. One or more of the films can contain a microchannel 14 (embedded channel) of conductive liquid (eutectic Gallium Indium ("eGaIn")) that is oriented along the strut. Bending the sensor induces compressive force in the strut, which consequently exerts a pressure on the embedded channel 14. This pressure causes the cross-section of the channel to elastically deform and, following Ohm's law, leads to a change in electrical resistance.

Referring to FIG. 1(*g*), two elastomer films of thickness h are separated by a gap of height g and length L. The top film contains an embedded channel with a width w, height H, length λ, and a bottom wall thickness t. The two plates are connected along both their edges as well as along a strut of width s, height g, and a length λ that is co-linear with the embedded channel. Moderate bending will cause the sensor to form a circular arc of radius $r=1/\kappa$, where κ is the bending curvature. The magnitude $|\kappa|$ is estimated by measuring the corresponding change ΔR within the embedded channel. The sensor output ΔR scales linearly with the electrical resistivity ρ of the conductive liquid. eGaIn has a resistivity of $\rho=29.4\times 10^{-8}$ Ω/m, comparable to other metal alloys, while for conductive inks and carbon-based liquid conductors, the resistivity can be several orders of magnitude higher.

Bending the sensor with a small or moderate curvature κ (see FIG. 1(*h*)), causes the outer film to stretch with a membrane strain $\epsilon_0=\kappa(g+h)/2$ and the inner film to shorten with an equal and opposite membrane strain $-\epsilon_0$[15]. According to Hooke's law, bending will induce an internal force of magnitude $f=B\lambda h(g+h)\kappa/2$, where B is the bending modulus[16] and it is assumed that the plates have about the same length λ as the strut and channel. The axial force f induces a compressive force $P=2f\sin(\kappa L/2)$ in the strut (FIG. 1(*i*)).

Depending on whether the strut is more narrow or wider than the channel (i.e. s<w or s>w, respectively), this bending-induced compression will cause the strut to either pierce into the channel or elastically deform the elastomer surrounding the channel. In the former case (s<w), the corresponding change in electrical resistance R will be controlled by the wall thickness t and suspended width $\xi=(w-s)/2$. In the latter case (s>w) where the strut is wider than the channel, R will be influenced by the bending modulus B.

Pressure Mode (s>w)

When the strut is wider than the channel, compressive pressure from the strut will be distributed uniformly around the channel. This loading condition is similar to that previously addressed in [2, 13], in which pressure p is exerted on the surface of an elastomer half space embedded with a microchannel of conductive liquid. According to that analysis, the relative change in electric resistance is approximately $\Delta R/R_0=\{1-2wp/BH\}^{-1}-1$, where $R_0=\rho\lambda/wH$ is the original (undeformed) electrical resistance and ρ is the electrical resistivity of the liquid.

The pressure p is estimated by simply dividing the strut force P by its cross sectional area: $p=P/s\lambda$. Substituting in the values for P, f, and p into ΔR, $$\Delta R = \frac{\rho\lambda}{wH}\left\{\frac{1}{1-\alpha\kappa h\sin(\kappa L/2)}-1\right\} \quad (1)$$

where $\alpha=2w(g+h)/Hs$. As expected, the electrical resistance increases monotonically with increasing absolute curvature $|\kappa|$ and increases by the same amount regardless of whether κ is positive or negative. Moreover, the solution suggests that ΔR increases with increasing film thickness h, gap height g, and gap length L and decreasing strut width s. Interestingly, ΔR is invariant to B, although the bending modulus will control how much moment is required to reach a prescribed curvature κ:

Collapse Mode (s<w)

In an event where the channel is wider than the strut, i.e. s<w, the strut can be treated as a rigid link supported by two flexible plates of thickness t, width λ, and length $\xi=(w-s)/2$. Compression in the strut will cause the plates to deflect into the channel by an amount $v(x)=Px^2\{3(w-s)/4\lambda-x\}/B\lambda t^3$, where x is the distance from the channel sidewall. Noting that the strut displaces by an amount $v_0=P(w-s)^3/16B\lambda t^3$ into the channel, the total change in channel cross-section can be estimated as:

$$\Delta A = v_0 s + 2\int_0^\xi v(x) = \frac{P(3s+w)(w-s)^3}{64B\lambda t^3} \quad (2)$$

This results in an electrical resistance $R=\rho\lambda/(wH-\Delta A)$. Lastly, substituting in the values for ΔA, P, and f yields an estimate of the total change in electrical resistance:

$$\Delta R = \frac{\rho\lambda}{wH}\left\{\frac{1}{1-\beta\kappa h\sin(\kappa L/2)}-1\right\} \quad (3)$$

where $\beta=(g+h)(3s+w)(w-s)^3/64wHt^3$. As in (1), $\Delta R$ monotonically increases with increasing curvature $|\kappa|$, plate thickness h, gap height g, and gap length L. However, it is no longer monotonically dependent on strut width s.

Large Curvature

For large bending curvatures, the compressive membrane force f induced within the inner film will exceed its critical buckling strength $f_{cr}$ and the film will buckle. For a thin plate clamped at both ends, first-mode buckling corresponds to a critical strength $f_{cr}=4\pi^2 Bwh^3/3L^2$. Plate buckling limits the compressive force in the strut to a value $P_{cr}=2f_{cr}\sin(\kappa L/2)$. In general, $P=\min(2f\sin(\kappa L/2), P_{cr})$, which leads to a deviation from equations (1) and (3) when $|\kappa|$ exceeds the critical value $\kappa_{cr}=2 f_{cr}/B\lambda h(g+h)$. Substituting this value of P into the expressions for strut p and $\Delta A$ leads to new algebraic formulas for $\Delta R$ in the buckling regime where $|\kappa|>\kappa_{cr}$.

It is important to note that in addition to axial load f, the plates are subject to an internal bending moment. This combined loading leads to non-linear deflection even when $f<f_{cr}$. This "premature" subcritical plate buckling can cause the gap to collapse and redirects compressive stress away from the strut and towards the new plate contacts. Hence, $P_{cr}$ and $\kappa_{cr}$ represent upper bounds and the corresponding theoretical predictions for $\Delta R$ may overestimate the true change in electrical resistance.

In application, curvature measurements can be performed on three elastomer sensors, for example, two that are 6 mm thick and a third that is 1.3 mm thick. The 6 mm thick samples can be produced by pouring uncured PDMS (Dow Corning) or soft silicone rubber (EcoFlex® 0030, SmoothOn) into a 3D printed mold (Connex 500, Objet Ltd.). The 1.3 mm samples can be produced by spin coating uncured PDMS on glass slides that are covered with laser-cut (VersaLaser system, Universal Laser Systems) adhesive films. After curing, the rubber sheets can be released and bonded together either with oxygen plasma treatment (for PDMS, Plasma Prep IIITM, SPI Supplies) or a spun coat layer of uncured rubber (for EcoFlex®). Next, a syringe can be used to fill the embedded channels with eutectic Gallium Indium (eGaIn, 99.9% pure, Sigma-Aldrich). Wires can be inserted into the ends of the channels, which are then sealed with a drop of uncured rubber.

The change in electrical resistance $\Delta R$ can be measured as a function of bending curvature $\kappa$. Rigid plastic clamps can be fitted around the bonded edges of the elastomer. Pure bending can be induced by positioning the base of the plastic clamps at various geometrically-defined orientations. These positions and orientations can be carefully selected so that the sensor bends into a circular arc of radius $r=1/\kappa$ without stretching. The clamps can be sequentially oriented from 0° to 90°, back to 0°, then to −90°, and lastly back to 0°. The change in electrical resistance ($\Delta R$) can be measured with a precision multimeter (Agilent 34401A). The scatter in data can be attributed to the manual rotation of the clamps and can be mitigated with an automated testing platform.

Figure 2A:
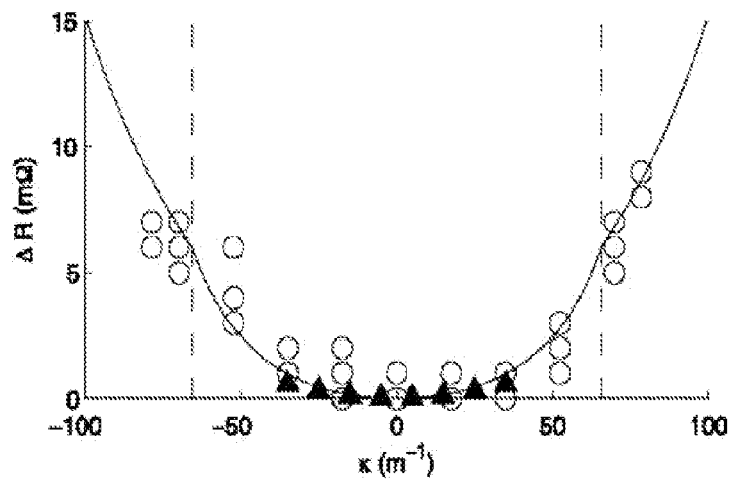
FIG. 2(*a*) illustrates a graphical change in electrical resistance ΔR as a function of pure bending curvature for a 6 mm thick PDMS sensor according to an exemplary disclosed embodiment.
Figure 2B:
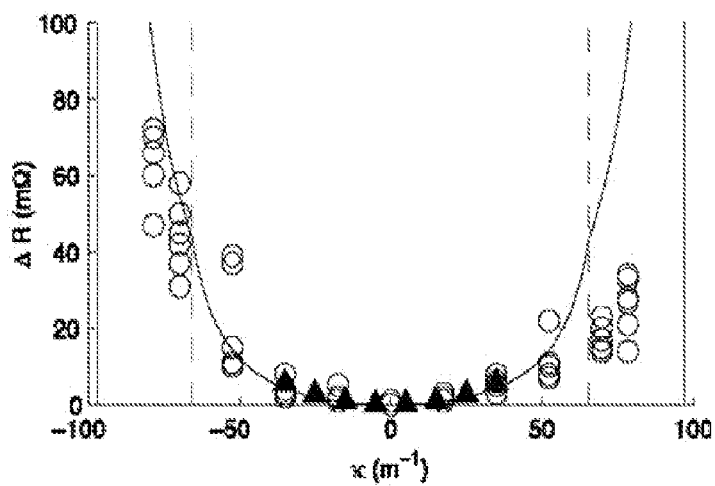
Figure 2C:
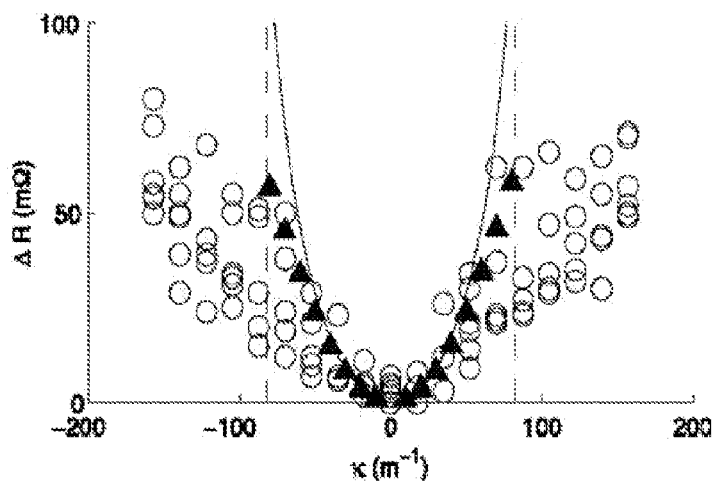

FIGS. 2(a)-(c) illustrate change in electrical resistance $\Delta R$ as a function of pure bending curvature $\kappa$. Experimental measurements (open circles) and theoretical prediction (solid curve) for a 6 mm thick (a) PDMS and (b) Ecoflex® sensors and (c) a 1.3 mm thick PDMS sensor. The vertical dashed lines correspond to $\kappa=\kappa_{cr}$. For the 6 mm sensors, L=20 mm, g=2 mm, $\lambda$=26 mm, H=0.5 mm, h=2 mm, s=2 mm, t=0.4 mm, w=3 mm (PDMS), and w=1 mm (Ecoflex®). For the 1.3 mm sensor, L=10 mm, g=0.3 mm, $\lambda$=16 mm, H=50 μh=0.5 mm, s=1 mm, t=0.1 mm, w=0.8 mm. The closed triangle markers correspond to theoretical predictions based on FEM solutions for f.

Experimentally measured values of $\Delta R$ can be plotted versus $\kappa$ for 6 mm thick PDMS (FIG. 2(a)) and EcoFlex® (FIG. 2(b)) sensors and a micropatterned 1.3 mm thick PDMS sensor (FIG. 2(c)). The sensors demonstrate the expected monotonic dependency of electrical resistance on absolute bending curvature. Nonetheless, there appears to be considerable scatter in the experimental data. This is predominately caused by the motion of the wires that connect the liquid microchannels with the multimeter. Because eGaIn has low electric resistivity, the external wiring and electrical connections contribute significantly to both the total resistance and resistance fluctuations. Other sources of scatter may include manual reorientation of the clamps and fluidic or viscoelastic effects in the sensor itself.

Theoretical predictions can be also plotted in FIGS. 2(a)-(c) and appear to be in reasonable agreement with the experimental measurements. Solutions based on a finite element (FEM) solution for f (COMSOL Multiphysics 4.0a, COMSOL AB) are plotted with closed triangle markers. These FEM solutions account for subcritical buckling induced by combined axial and moment loading in the plates and hence provide a more accurate estimate of the bending resistance. For the 6 mm thick PDMS sensor, the embedded channel is wider than the strut and so the collapse mode solution in Equ. (3) can be used to predict $\Delta R$. For the other two samples, the strut is wider and so the pressure mode solution in Equ. (1) can be used. In all cases, the reasonable agreement between theory and experiment is achieved without the aid of data fitting. This indicates that the theoretical models are predictive and the $\Delta R$–$\kappa$ curve can be established apriori from prescribed sensor geometries (w, L, h, H, g, s, t, $\lambda$) and conductor resistivity ($\rho$).

Conventional curvature sensors use differential strain, in which a strain sensor is placed off of the neutral axis by a distance z and measures a strain $\epsilon=\kappa z$. For these sensors, the gauge factor GF can be defined as the ratio of the relative change in electrical resistance to the corresponding strain, i.e. $GF=(\Delta R/R_0)/\epsilon$. For elastomer-based strain sensors, $\Delta R/R_0$ can be approximately $2\epsilon$ and so $GF\sim 2$ and can be invariant to film thickness or material. In contrast, the curvature sensors of disclosed embodiments presented herein do not have a fixed GF, and $\Delta R/R_0$ can be scale invariant to total thickness $Z=2h+g$. Dividing by $\epsilon=\kappa Z$ yields the equivalent gauge factor:

$$GF = \frac{1}{(2h+g)\kappa}\left\{\frac{1}{1-\chi\kappa h\sin(\kappa L/2)}-1\right\} \quad (4)$$

where $\chi$ equals $\alpha=2w(g+h)/Hs$ or $\beta=(g+h)(3s+w)(w-s)^3/64wHt^3$ depending on the mode of channel deformation. Therefore, any arbitrary gauge factor can be achieved for a prescribed bending curvature $\kappa$ by selecting the appropriate sensor geometries.

Complete shape mapping can be accomplished by combining curvature sensors with strain and pressure sensing. Since all of the sensing elements scale differently with stretch, curvature, and pressure, it is possible to decouple these values by comparing each sensor measurement $\Delta R$. This can be done mathematically from the algebraic expressions for $\Delta R$ or graphically from the sensor response curves. Also, in order to determine the sign of bending curvature, two curvature sensors must be placed on top of each other. Due to the buckling-induced asymmetry, the sensor embedded inside the inner film will register a smaller change in electrical resistance. Therefore, the sign of bending curvature can be determined by identifying the sensor with the smaller measured ΔR. Alternatively, two curvature sensors can be placed side-by-side with thicker backings on opposite surfaces to induce buckling asymmetry. In both cases, the film containing the sensor should be sufficiently thin so that buckling occurs below the prescribed sensitivity threshold.

Thus, advantages of the disclosed embodiments provide, inter alia, a hyperelastic, soft microfluidic film which measures bending curvature using a novel non-differential mechanism. In contrast to conventional curvature sensors that use a strain sensor offset from the neutral axis, this disclosed elastomer-based solution allows for curvature sensing directly on the bending plane and thus eliminates limitations imposed by strain gauge factor (GF) and sensor thickness (Z). Additional advantages afforded by the present invention allow future efforts to focus on the integration of non-differential curvature sensing into a stretchable, softer-than-skin elastomer that completely maps shape and surface pressure.

Because pressure sensors according to such disclosed embodiments can be composed entirely of soft elastomer and liquid, such pressure sensors can remain functional even when substantially stretched, for example by as much as 500%. Moreover, because of the low stiffness of such pressure sensors, embodiments can be mechanically compatible with natural human motion.

Figure 3:
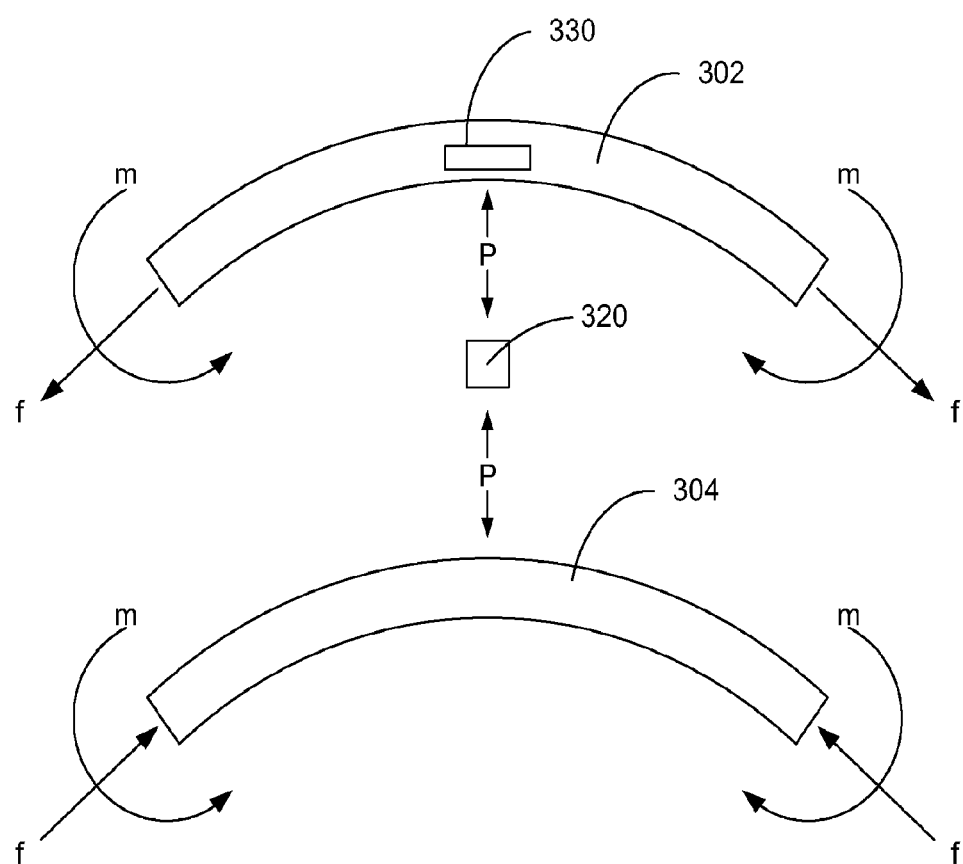
FIG. 3 is a free body diagram showing a moment analysis of a curvature sensor according to one embodiment of the present invention.

FIG. 3 shows a diagrammatic view of the free body forces experienced by a curvature sensor according to the present invention, such as those shown in FIGS. 1A-1I and 4A-4B. The free body diagram of curvature sensor shows that according to one embodiment of the invention, the curvature sensor can be formed from at least one upper plate 302 having a channel 330, at least one lower plate 304 and a strut 320 that are exposed to forces that cause the sensor to bend, for example, as shown. The bending of the curvature sensor causes bending induced axial forces f and bending moments m to be applied to the upper plate 302 and the lower plate 304. The upper plate 302 is stretched and the lower plate 304 is compressed. The axial force f induces a compressive force $P=2f \sin(\kappa L/2)$ in the strut 320. If the channel 330 is wider than the strut (s<w) then this bending-induced compression will cause the strut to pierce into the channel 330 as illustrated in see FIG. 1I. Alternatively, if the strut is wider (s>w), then the elastomer will deform around the channel. In either case, the force P will reduce the cross-sectional area A of the embedded channel and cause the electrical resistance R to decrease by an amount ΔR.

In accordance with various embodiments of the invention, mechanical coupling between plate bending and internal pressure allows the magnitude lid to be determined from the corresponding change in electrical resistance, ΔR, within the embedded channel. In some embodiments, the sensor output ΔR is proportional to the electrical resistivity ρ of the conductive liquid, for example, eGaIn. eGaIn has a resistivity of $\rho = 29.4 \times 10^{-8}$ χm-1 that is comparable to other metal alloys and several orders of magnitude lower than the resistivity of conductive inks and carbon-based liquids.

Additionally, viscosity of the conductive liquid used to fill the channels and the viscoelasticity of the elastomeric sheet can be chosen to achieve a desired relaxation time. Both the elastomeric sheet and conductive liquid can be chosen to have as low a viscosity as possible, thus achieving a minimal relaxation time which may be desirable for certain applications. This relaxation time is on the order of η/E, where η is the coefficient of viscosity and E is the elastic modulus of the elastomer sheet. Elastomers with η on the order of 100 to 105 Pascal-seconds and E on the order of 100 to 1000 kiloPascals will relax within a fraction of a second.

Embodiments for forming the elastomeric sheet 200 can include those of conventional fashion, for example molds can be micromachined, printed, or milled from an inorganic solid or polymer and an elastomer can be cast into the mold, cured, and then released. Uncured elastomeric material (e.g., silicone rubber) can be poured into the mold, cured, for example at room temperature or under moderate heat (e.g., 60-100 degrees Celsius).

The elastomeric sheets can be bonded together, for example, by spin coating uncured rubber on a silicon wafer, coating the smooth side of each layer by wiping it on the wafer, stacking the layers, and then curing the composite. Thereafter, embedded channels can be filled with a conductive liquid in conventional fashion, for example by injecting conductive liquid into the channel from one or both open ends of the channel with a syringe. Of course, pressure sensors according to embodiments disclosed herein can be fabricated in other ways. For example, the open channels can be filed with a conductive liquid before the layers are bonded.

Of course, while some disclosed figures, of the present invention, illustrate elastomeric sheets having a limited number of embedded channels, one of ordinary skill in the art understands that these illustrations are for explanation only and that an elastomeric sheet according to embodiments can have any dimensions and any number of channels embedded therein.

The size of channels of the disclosed embodiments of the curvature sensor(s) can be controlled by the geometry of the mold used for casting the elastomeric sheets. For example, for high resolution sensing with distinct curvature measurements spaced 1 to 1000 microns apart, the channels can be formed 1 to 1000 microns in width and depth. Increasing the ratio of width to depth improves curvature sensitivity. The ratio can be selected to be greater than 1 to provide a high resolution. Photolithographic processing can be used for curvature sensors having cross-sectional dimensions of less than 250 microns.

While embodiments disclosed herein refer to detecting the location and intensity of pressure received on a surface of a pressure sensor, one of ordinary skill in the art understands that embodiments can detect the location and intensity of multiple points of pressure on a surface or varying degrees of pressure across the entire surface of a pressure sensor.

Additionally, while channels illustrated in embodiments herein appear to generally have rectangular cross-sections, alternative shaped cross-sections can be used. Moreover, embodiments shown herein illustrate channels having a substantially perpendicular alignment. Of course, alternative embodiments can have grids of channels embedded in elastomeric sheets crossing at alternative angles, for example in a pattern forming diamonds rather than squares. In still other embodiments, more than two sets of channels can be embedded in an elastomeric sheet. For example, embodiments can have three sets of channels, each oriented at a sixty degree offset, thus creating a grid of equilateral triangles.

Figure 4A:
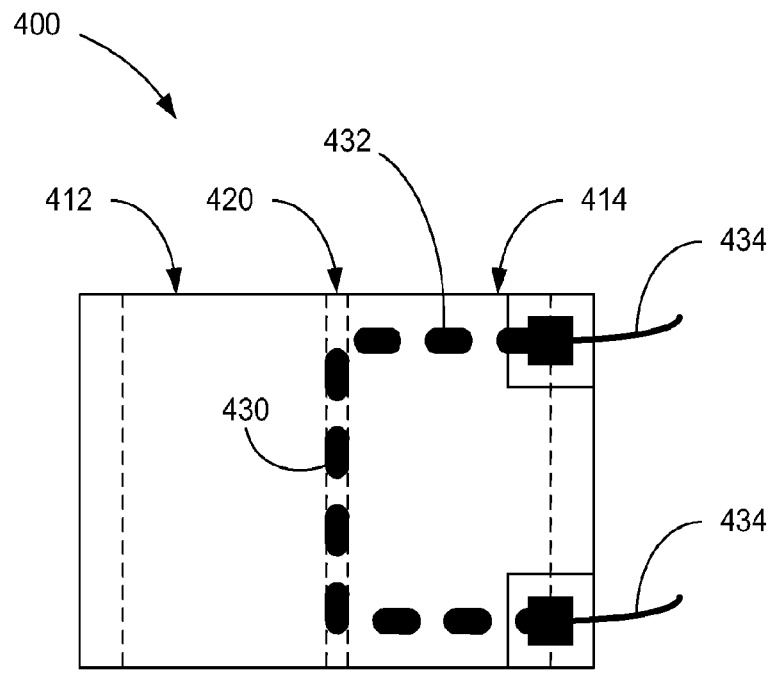
FIGS. 4A and 4B show diagrammatic views of a curvature sensor according to one embodiment of the present invention.
Figure 4B:
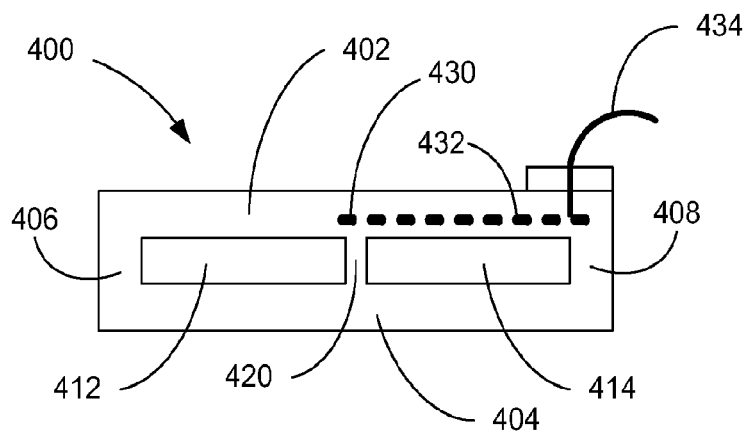

FIGS. 4A and 4B show diagrammatic views of a curvature sensor 400 according to one embodiment of the present invention. The curvature sensor 400 can be formed from two or more plates or layers 402 and 404 that are bonded along opposite ends 406 and 408 and along a central portion by a strut 420. In some embodiments the strut 420 can be arranged to extend along a midline of the device. In other embodiments one or more struts 420 can be provided. As shown in FIG. 4A, the resulting device includes a top plate 402 separated from the bottom plate 404 by space 412 and space 414. One of the plates or layers further includes a microchannel 430 having a defined height and width that extends along the strut 420. The microchannel 430 can be filled with a conductive liquid, such as eutectic gallium indium (eGaIn) that responds to changes in pressure with changes in electrical resistance. The microchannel 430 can include extensions 432 that connect the ends of microchannel 430 to connecting wires 434 that enable the curvature sensor 400 to be connected to a measuring device, such as a multimeter or measuring system to measure the change in resistance of the conductive fluid in the microchannel. In some embodiments of the invention, the curvature sensor can include more than one strut 420 and corresponding microchannel 430. In some embodiments, more than one curvature sensor can be joined together or formed from a common pair of plates to enable curvature measurements over a larger surface.

Figure 5:
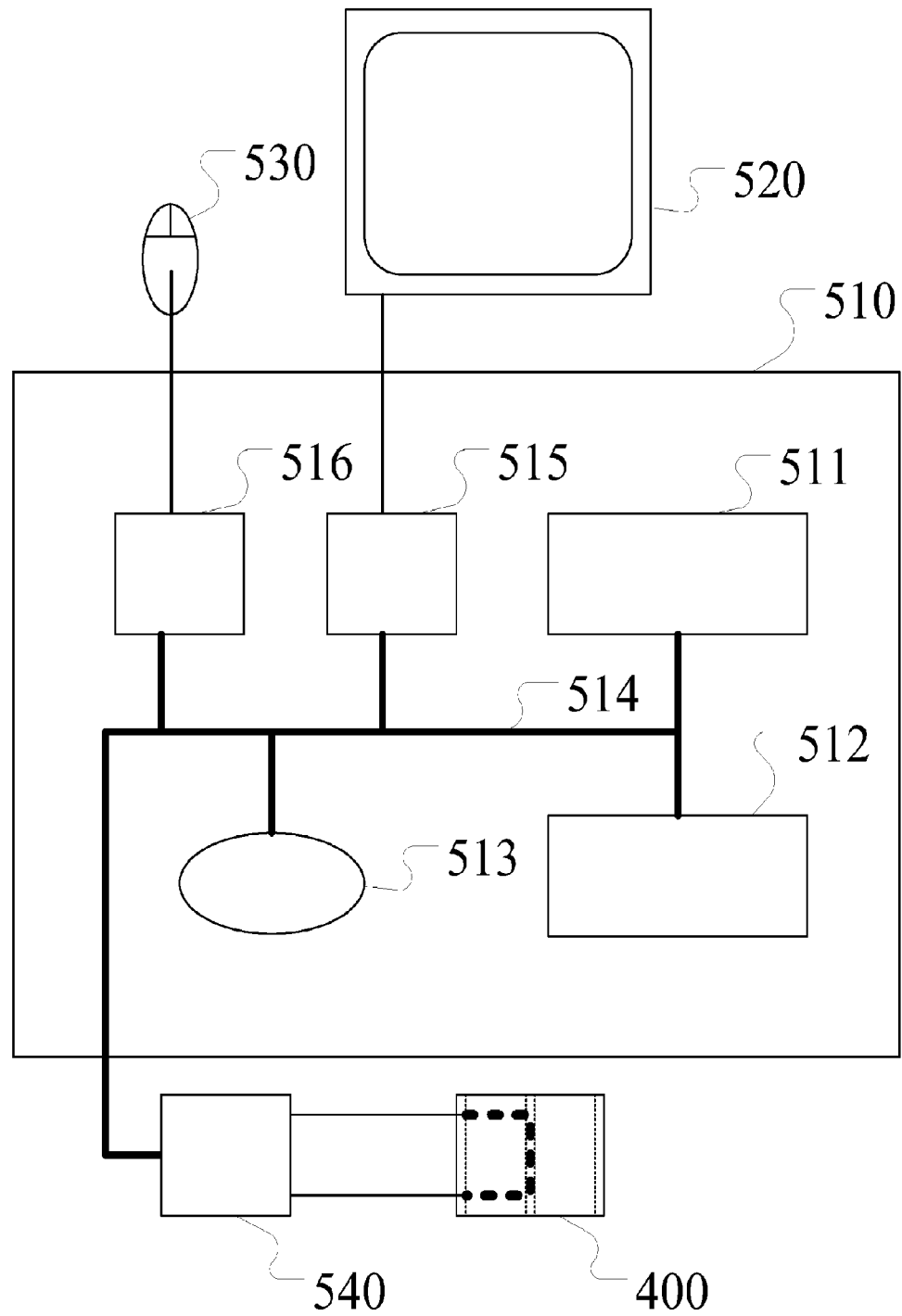
FIG. 5 illustrates an exemplary computing device useful for computing the location and intensity of bending curvature over an exemplary curvature sensor.

FIG. 5 illustrates a computing device 510 useful for computing the location and intensity of pressure over a pressure sensor, for example pressure sensor 305 of FIGS. 4A and 4B. Computing device 510 has one or more processing device 511 designed to process instructions, for example computer readable instructions stored on a storage device 513. By processing instructions, processing device 511 can render on a display device 520, for example a display showing the location and intensity of pressure received on a pressure sensor. Storage device 513 can be any type of storage device (e.g., an optical storage device, a magnetic storage device, a solid state storage device, etc.), for example a non-transitory storage device. Alternatively, instructions can be stored in remote storage devices, for example storage devices accessed over a network or the Internet. Computing device 510 additionally has memory 512, an input controller 516, and an output controller 515. A bus 514 operatively couples components of computing device 510, including processing device 511, memory 512, storage device 513, input controller 516, output controller 515, and any other devices (e.g., network controllers, sound controllers, etc.). Output controller 515 can be operatively coupled (e.g., via a wired or wireless connection) to a display device 520 (e.g., a monitor, television, mobile device screen, etc.) in such a fashion that processing device 511 and output controller 515 can transform the display on display device 520 (e.g., in response to modules executed). Input controller 516 can be operatively coupled (e.g., via a wired or wireless connection) to one or more input device 530 (e.g., mouse, keyboard, touch-pad, scroll-ball, touch-display, etc.) in such a fashion that input can be received from a user. Additionally, input controller 516 and/or output controller 515 can be operatively coupled to one or more ohmmeters 540 to receive as input signals indicating the electric resistance or change in electric resistance of conductive fluid in each channel of a curvature sensor 400.

Of course, FIG. 5 illustrates computing device 510, display device 520, and input device 530 as separate devices for ease of identification only. Computing device 510, display device 520, and input device 530 can be separate devices (e.g., a personal computer connected by wires to a monitor and mouse), can be integrated in a single device (e.g., a mobile device with a touch-display, such as a smartphone or a tablet, or a wearable device), or any combination of devices (e.g., a computing device operatively coupled to a touch-screen display device, a plurality of computing devices attached to a single display device and input device, etc.). Additionally, a computing device 510 may not be operatively coupled to a display device 520 or an input device 530, but rather can be operatively coupled to other computing devices, for example computing devices in part of a system for wearable computing, soft orthotics, or biomechanical monitoring. Further, while computing device 510 is shown as a single, discrete device, computing device 510 can be multiple computing devices coupled (e.g., networked) together, for example a cloud computing system or a clustered server.

Embodiments can include software configured for computing the intensity and location of bending curvature received by a curvature sensor, for example curvature sensor 400 of FIGS. 4A and 4B. For example, computer-readable instructions can be stored on non-transitory storage device 513. The computer-readable instructions can be configured to be processed by processing device 511 to receive a first set of signals from one or more ohmmeter indicating the electric resistance of conductive fluid filling each of a plurality of channels in a curvature sensor, to receive a second set of signals from the ohmmeter indicating the electric resistance of the conductive fluid filling each of the plurality of channels in the curvature sensor, compute a difference in electric resistance of the conductive fluid filling each of the plurality of channels in the curvature sensor, compute the intensity and location of curvature received by the curvature sensor, and output signals including the intensity and location of curvature received by the curvature sensor. The output can be to a display device or to a further computing device for example.

Curvature sensors according to embodiments disclosed herein have many potential applications. For example, such curvature sensors can be useful in joining angle monitoring, foot contact sensing, and curvature in soft orthotic insoles. Electromechanically active insoles and orthotic sleeves rely on hyperelastic curvature sensing in order to determine the appropriate stimulation needed to improve stance stability or gait locomotion in patients with brain injury or degraded motor control. Such sensors should be softer than skin in order to avoid altering the natural mechanics of the foot or joint.

In addition to medical orthoses, hyperelastic curvature and stretch sensing can be used to monitor motion and contact during athletic activity. Because curvature sensors according to embodiments disclosed herein are soft and durable, they can remain functional under a broad range of loading and impact conditions and not interfere with the natural mechanics of the athlete. Curvature sensing is particularly important for monitoring impact curvature in both foot-ground and ball-body contact. Stretch sensing can be used to monitor limb extension and cardiovascular chest expansion.

Further, curvature sensors according to embodiments disclosed herein can be useful for tactile sensing for stretchable touch screens, soft autonomous robots, curvature sensing for folding programmable matter, and wearable electronics. Flexible electronics and rollable computer displays represent preliminary efforts towards fully functional stretchable and wearable computers that can radically change their form factor and conform to human morphology and motion.

Of course, these are only exemplary applications of embodiments of curvature sensors disclosed herein. One of ordinary skill in the art understands that such curvature sensors can be useful for a broad range of other applications. While the stretchable curvature sensor is described herein by way of example and embodiments, those skilled in the art will recognize that the curvature sensor and method of fabricating the curvature sensor is not limited to the embodiments or drawings described. It should be understood that the drawings and description are not intended to limit embodiments to the particular form disclosed. Rather, the intention is to cover all modifications, equivalents and alternatives falling within the spirit and scope of the invention defined by the appended claims. Any headings used herein are for organizational purposes only and are not meant to limit the scope of the description or the claims. Similarly, the words "include", "including", and "includes" mean including, but not limited to.

The invention has been described through various embodiments. However, various modifications can be made without departing from the scope of the invention as defined by the appended claims and legal equivalents.

What is claimed is:

1. A method of determining a measure of curvature applied to a curvature sensor, the curvature sensor including a conductive fluid filling a channel embedded in the curvature sensor, the method comprising:
   measuring a change in curvature along a bending plane of the curvature sensor by:
      measuring at a first time the electric resistance of the conductive fluid;
      measuring at a second time the electric resistance of the conductive fluid;
      determining a relative change in the electrical resistance of the channel; and
      determining the change in curvature as a function of the change in electrical resistance.

2. A method according to claim 1 wherein the curvature sensor further includes a strut and bending the curvature sensor causes the strut to apply pressure on the conductive liquid filling the channel.

3. A method according to claim 2 wherein the strut is wider than the channel and the change in curvature is proportional to the change in the electrical resistance of the channel.

4. A method according to claim 2 wherein the strut is narrower than the channel and the in curvature is proportional to the change in the electrical resistance of the channel.

5. A curvature sensor comprising:
   a first plate having a length dimension and width dimension and at least one channel extending along a channel axis parallel to the length dimension of the first plate;
   a second plate having a length dimension and width dimension, the second plate being fastened to the first plate along a first axis parallel to the length dimension of the first plate and along a second axis parallel to the length dimension of the first plate;
   a strut separating the first plate from the second plate, the strut extending along an axis parallel to the channel axis, whereby bending the first plate causes the strut to apply pressure on the channel; and
   wherein the channel includes a conductive liquid material having an electrical resistance that changes when the strut applies pressure on the channel.

6. A curvature sensor according to claim 5 wherein the strut has a width dimension and the channel has a width dimension and the width dimension of the strut is greater than the width dimension of the channel.

7. A curvature sensor according to claim 5 wherein the strut has a width dimension and the channel has a width dimension and the width dimension of the channel is greater than the width dimension of the strut.

8. A curvature sensor according to claim 5 wherein a change in the electrical resistance of the conductive liquid is proportion to a change in curvature of the first plate.

9. A curvature sensor according to claim 5 wherein the channel axis is between the first axis and the second axis.

10. A system sensor according to claim 5 wherein the strut axis is between the first axis and the second axis.

11. A system for measuring a change in curvature of a surface, the system comprising:
   a computer system having a computer processor and associated memory, the memory including memory for storing data and computer programs;
   a curvature sensor having a first plate separated from a second plate by a strut, the strut extending along a strut axis and the first plate and the second plate being fastened together along a first portion extending along a first axis substantially parallel to the strut axis and along a second portion extending along a second axis substantially parallel to the strut axis, the first plate including a channel extending along a channel axis extending substantially parallel to the strut axis; the channel including a conductive liquid material having an electrical resistance that changes when the strut applies pressure on the channel; and
   an interface module connecting the conductive liquid in the channel to the computer system, whereby changes in curvature of the curvature sensor cause signals representative of the change in electrical resistance of the conductive liquid to be transferred to the computer.

12. A system according to claim 11 wherein the strut has a width dimension and the channel has a width dimension and the width dimension of the strut is greater than the width dimension of the channel.

13. A system according to claim 11 wherein the strut has a width dimension and the channel has a width dimension and the width dimension of the channel is greater than the width dimension of the strut.

14. A system sensor according to claim 11 wherein a change in the electrical resistance of the conductive liquid is proportion to a change in curvature of the curvature sensor.

* * * * *